(12) United States Patent
Schembri

(10) Patent No.: US 12,383,828 B2
(45) Date of Patent: Aug. 12, 2025

(54) DATA PROCESSING APPARATUS AND METHOD

(71) Applicant: Sony Interactive Entertainment Inc., Tokyo (JP)

(72) Inventor: Danjeli Schembri, London (GB)

(73) Assignee: Sony Interactive Entertainment Inc., Tokyo (JP)

( * ) Notice: Subject to any disclaimer, the term of this patent is extended or adjusted under 35 U.S.C. 154(b) by 267 days.

(21) Appl. No.: 18/337,643

(22) Filed: Jun. 20, 2023

(65) Prior Publication Data

US 2023/0415039 A1 Dec. 28, 2023

(30) Foreign Application Priority Data

Jun. 24, 2022 (GB) ...................................... 2209265

(51) Int. Cl.
*G09G 5/00* (2006.01)
*A63F 13/52* (2014.01)
*G09G 5/10* (2006.01)

(52) U.S. Cl.
CPC .............. *A63F 13/52* (2014.09); *G09G 5/10* (2013.01); *G09G 2320/0653* (2013.01)

(58) Field of Classification Search
CPC ............ G09G 3/32; G09G 2310/0286; G09G 2310/08; G09G 2320/0233; G09G 3/20; G09G 3/3266; G09G 5/10; G09G 2320/0653; G09G 2320/0626; G09G 2320/0686; G09G 2340/06;
(Continued)

(56) References Cited

U.S. PATENT DOCUMENTS 10,964,262 B1 *   3/2021   Lin ..................... G09G 3/2022
2017/0249901 A1 *  8/2017   Nakamura ........... G09G 3/3266
(Continued)

FOREIGN PATENT DOCUMENTS

CN      110381276 A     10/2019
JP      2004354913 A    12/2004

OTHER PUBLICATIONS

Combined Search and Examination Report for corresponding GB Application No. 2209265.4, 8 pages, dated Dec. 28, 2022.

*Primary Examiner* — Pegeman Karimi
(74) *Attorney, Agent, or Firm* — Kilpatrick Townsend & Stockton LLP

(57) ABSTRACT

A data processing apparatus comprising-includes circuitry configured to: receive one or more pairs of first and second frames of a video image to be output for display; determine a first value indicative of a brightness of one or more pixels of the first frame in each pair; determine a second value indicative of a brightness of a corresponding one or more pixels of the second frame in each pair; based on a difference between the first and second values of each pair, adjust a pixel value of the one or more pixels of the first frame in each pair or adjust a pixel value of the corresponding one or more pixels of the second frame in each pair to reduce the magnitude of the difference between the first and second values of each pair; and output the first and second frames of each pair with the adjusted pixel value of the one or more pixels of the first frame or with the adjusted pixel value of the corresponding one or more pixels of the second frame for display.

10 Claims, 8 Drawing Sheets

(58) Field of Classification Search
CPC .. G09G 2360/16; G11C 19/287; G11C 19/28; A63F 13/52; G06T 5/50
See application file for complete search history.

(56) References Cited

U.S. PATENT DOCUMENTS

2021/0014402 A1\* 1/2021 Nossek ................. H04N 23/73
2022/0343848 A1\* 10/2022 Jeon ..................... G09G 3/3233

\* cited by examiner

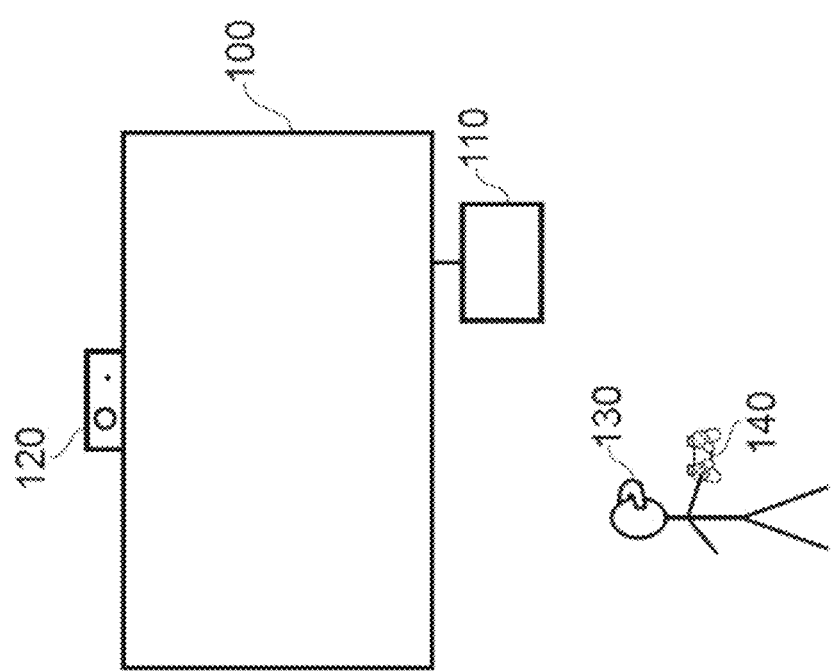

DATA PROCESSING APPARATUS AND METHOD

BACKGROUND

Field of the Disclosure

This disclosure relates to a data processing apparatus and method.

Description of the Related Art

The "background" description provided is for the purpose of generally presenting the context of the disclosure. Work of the presently named inventors, to the extent it is described in the background section, as well as aspects of the description which may not otherwise qualify as prior art at the time of filing, are neither expressly or impliedly admitted as prior art against the present disclosure.

Digital content such as video games may include scenes with flashing lighting. For example, a video game may have a scene showing lightening or showing the inside of a building with a failing lighting system. The flashing lighting may add to the drama and immersion of the user in the video game. However, flashing lighting is not suitable for all users. For example, some users may be sensitive to flashing lighting and may feel unwell or uncomfortable because of it, thereby reducing their enjoyment of the content. There is therefore a desire to address this.

SUMMARY

The present disclosure is defined by the claims.

BRIEF DESCRIPTION OF THE DRAWINGS

Non-limiting embodiments and advantages of the present disclosure are explained with reference to the following detailed description taken in conjunction with the accompanying drawings, wherein:

FIG. 1 schematically illustrates an example entertainment system;

Like reference numerals designate identical or corresponding parts throughout the drawings.

DETAILED DESCRIPTION OF THE EMBODIMENTS

FIG. 1 schematically illustrates an entertainment system suitable for implementing one or more of the embodiments of the present disclosure. Any suitable combination of devices and peripherals may be used to implement embodiments of the present disclosure, rather than being limited only to the configuration shown.

A display device 100 (e.g. a television or monitor), associated with a games console 110, is used to display content to one or more users. A user is someone who interacts with the displayed content, such as a player of a game, or, at least, someone who views the displayed content. A user who views the displayed content without interacting with it may be referred to as a viewer. This content may be a video game, for example, or any other content such as a movie or any other video content. The games console 110 is an example of a content providing device or entertainment device; alternative, or additional, devices may include computers, mobile phones, set-top boxes, and physical media playback devices, for example. In some embodiments the content may be obtained by the display device itself—for instance, via a network connection or a local hard drive.

One or more video and/or audio capture devices (such as the integrated camera and microphone 120) may be provided to capture images and/or audio in the environment of the display device. While shown as a separate unit in FIG. 1, it is considered that such devices may be integrated within one or more other units (such as the display device 100 or the games console 110 in FIG. 1).

In some implementations, an additional or alternative display device such as the head-mountable display (HMD) 130 may be provided. Such a display can be worn on the head of a user, and is operable to provide augmented reality or virtual reality content to a user via a near-eye display screen. A user may be further provided with a controller 140 which enables the user to interact with the games console 110. This may be through the provision of buttons, motion sensors, cameras, microphones, and/or any other suitable method of detecting an input from or action by a user.

Figure 2A:
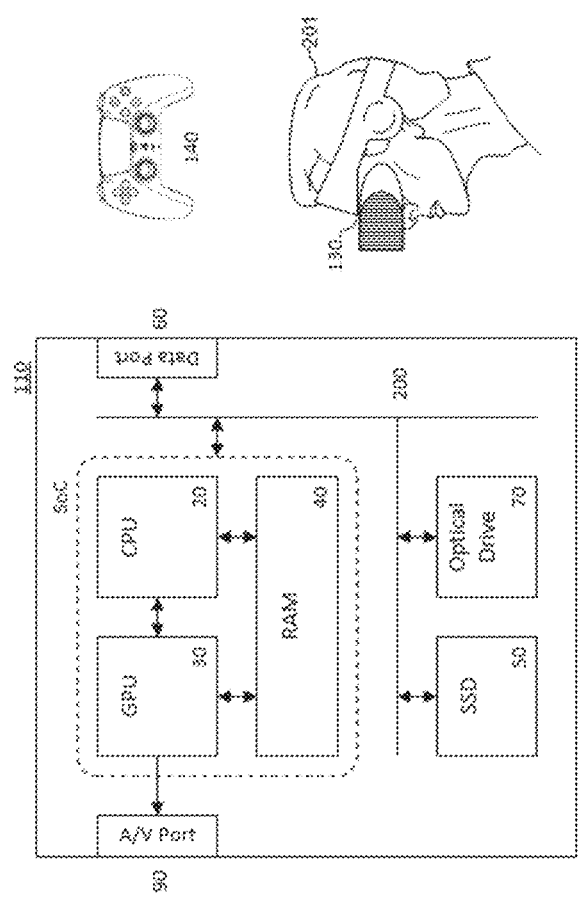
FIGS. 2A and 2B schematically illustrate example components of the entertainment system.

FIG. 2A shows an example of the games console 110. An example is the Sony® PlayStation 5® (PS5).

The games console 110 comprises a central processing unit or CPU 20. This may be a single or multi core processor, for example comprising eight cores as in the PS5. The games console also comprises a graphical processing unit or GPU 30. The GPU can be physically separate to the CPU, or integrated with the CPU as a system on a chip (SoC) as in the PS5.

The games console also comprises random access memory, RAM 40, and may either have separate RAM for each of the CPU and GPU, or shared RAM as in the PS5. The or each RAM can be physically separate, or integrated as part of an SoC as in the PS5. Further storage is provided by a disk 50, either as an external or internal hard drive, or as an external solid state drive (SSD), or an internal SSD as in the PS5.

The games console may transmit or receive data via one or more data ports 60, such as a universal serial bus (USB) port, Ethernet® port, WiFi® port, Bluetooth® port or similar, as appropriate. It may also optionally receive data via an optical drive 70.

Interaction with the games console is typically provided using one or more instances of the controller 140, such as the DualSense® handheld controller in the case of the PS5. In an example, communication between each controller 140 and the games console 110 occurs via the data port(s) 60.

Audio/visual (A/V) outputs from the games console are typically provided through one or more A/V ports 90, or through one or more of the wired or wireless data ports 60. The A/V port(s) 90 may also receive audio/visual signals output by the integrated camera and microphone 120, for example. The microphone is optional and/or may be separate to the camera. Thus, the integrated camera and microphone 120 may instead be a camera only. The camera may capture still and/or video images.

Where components are not integrated, they may be connected as appropriate either by a dedicated data link or via a bus 200.

As explained, examples of a device for displaying images output by the game console 110 are the display device 100 and the HMD 130. The HMD is worn by a user 201. In an example, communication between the display device 100 and the games console 110 occurs via the A/V port(s) 90 and communication between the HMD 130 and the games console 110 occurs via the data port(s) 60.

Figure 2B:
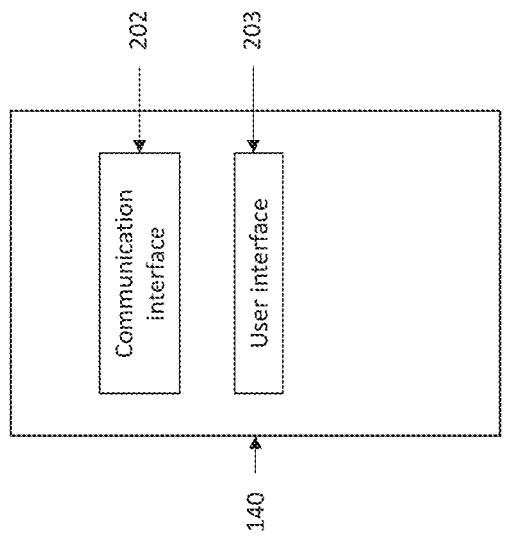

FIG. 2B shows some example components of the controller 140. The controller comprises a communication interface 202 for transmitting wireless signals to and/or receiving wireless signals from the games console 110 (e.g. via data port(s) 60) and a user interface 203 for receiving input from the user (e.g. comprising one or more of buttons, motion sensor(s), camera(s), microphone(s) or the like, as previously described). The communication interface 202 and user interface 203 are controlled by suitable control circuitry (not shown) of the controller 140.

As mentioned above, flashing lighting may be uncomfortable for some users. This may occur for lighting which flashes (that is, rapidly changes between on and off or between a brighter level and a darker level) with a flash rate (number of flashes per second) within a certain frequency range. For example, flash rates of between 3 and 60 flashes per second or, more particularly, between 16 and 25 times per second may be problematic for some users.

Figure 3:
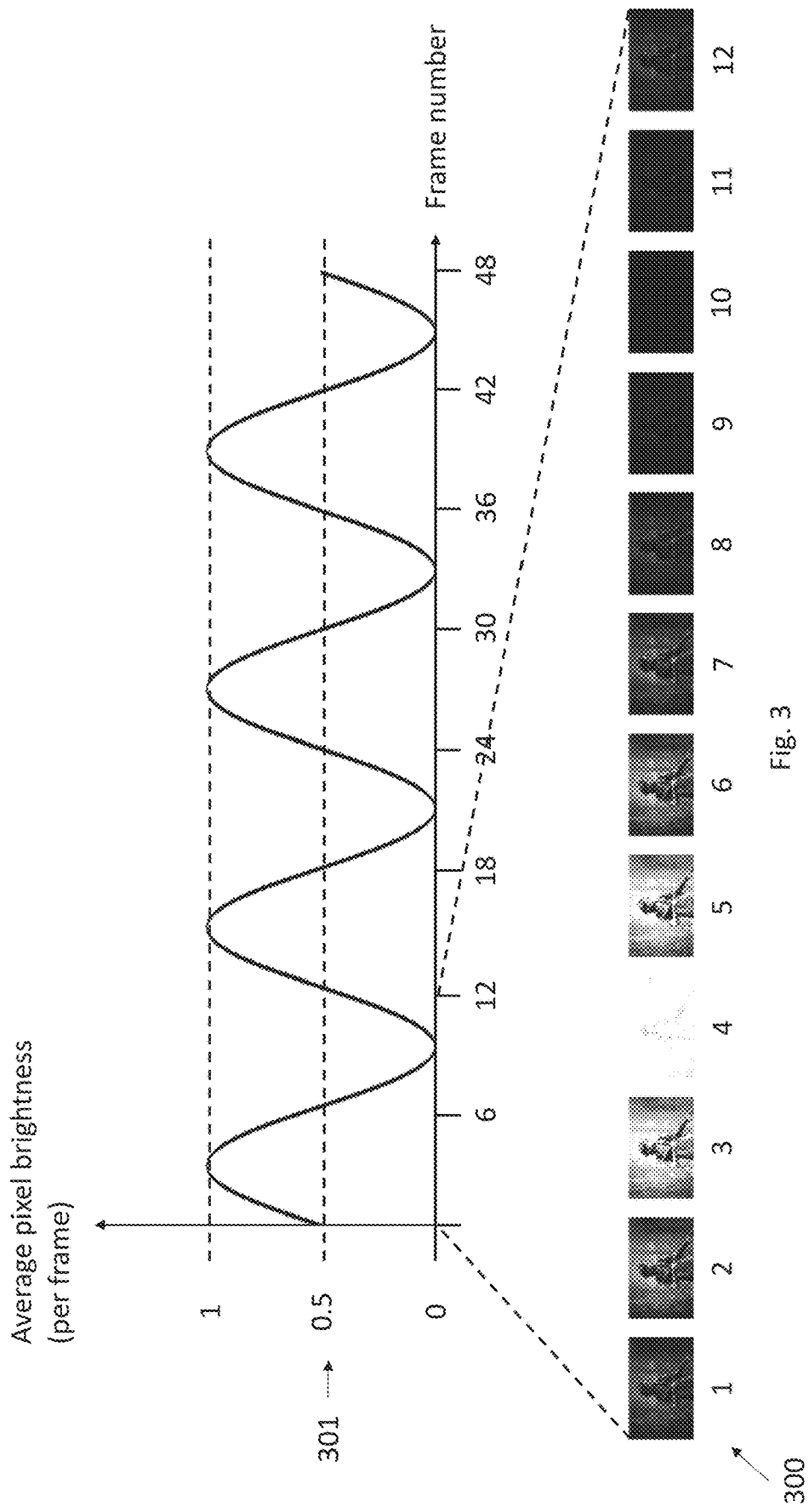
FIG. 3 exemplifies flashing lighting at a frequency (flash rate) which may be uncomfortable for some users.

Flash rates falling within such problematic ranges can be common in some digital content such as some video games. An example (which is for illustrative purposes only and may not reflect the true flash rates found in any particular digital content) of this is shown in FIG. 3.

In this example, a video game is rendered with a frame rate of 120 frames per second (FPS). 12 consecutive frames 300 displayed when a user plays the video game are shown. Also shown is a graph 301 showing how the average pixel brightness for each frame (determined by, for example, determining a value such as the pixel luminance or intensity indicating the brightness of each pixel in the frame and then determining the average of those values) changes from frame to frame. As is known in the art, the pixels of each frame are rendered using a pixel shader executed by the CPU 20 and/or GPU 30 according to video game code stored in the RAM 40, for example. In this example, a strobe light effect with a flash rate of 10 times per second is programmed for the scene. This means the average pixel brightness for the rendered frames changes between a maximum level ("1") and minimum level ("0") 10 times per second. Because the frame rate is 120 FPS, this means the average pixel brightness periodically changes between the maximum and minimum levels every 12 frames.

This is illustrated in the graph 301, which shows a periodic increase (up to "1") and decrease (down to "0") of the average pixel brightness over a period of 12 frames (this may be referred to as a flash cycle, which represents the time period of one flash at a given flash rate). The 12 consecutive frames 300 correspond to frame numbers 1-12 of the graph 301. It can be seen that the average pixel brightness of each frame starts at 0.5 (at frame 1), gradually increases to its maximum "1" (at frame 4), gradually decreases back to 0.5 (at frame 7), gradually decreases to its minimum "0" (at frame 10) and then increases again (reaching 0.5 again at frame 13 (not shown) which marks the beginning of the next period). It is noted that the average pixel brightness may be indicated using any suitable unit (for example, a suitable unit of pixel luminance). For simplicity, in this example, the average pixel brightness is normalised so "1" is the maximum brightness and "0" is the minimum brightness.

A flash rate of 10 times per second, however, is within the range of between 3 and 60 flashes per second which may cause problems for some users. To address this, the flash rate is reduced, as illustrated in FIG. 4.

Figure 4:
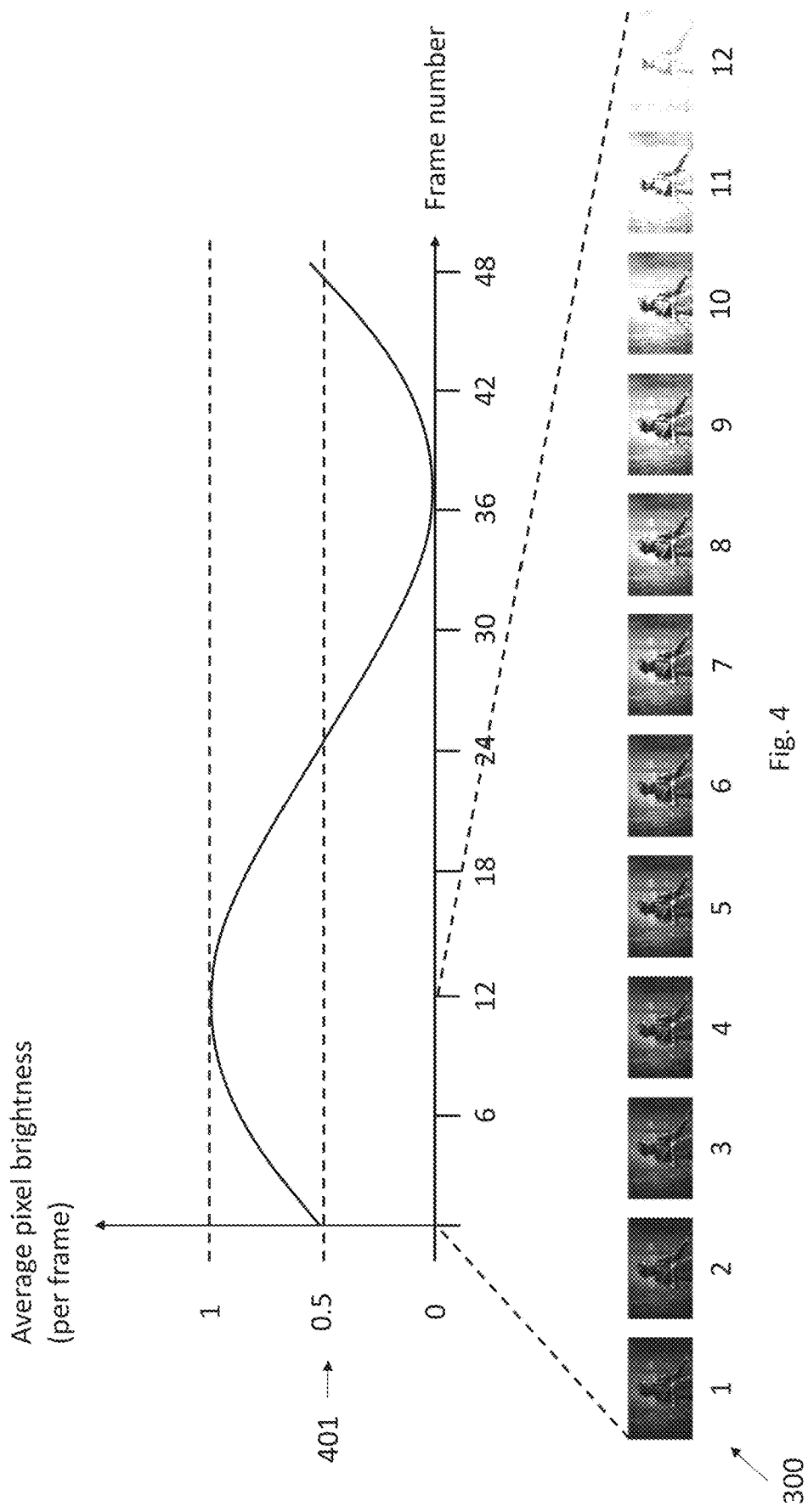
FIG. 4 exemplifies flashing lighting at a reduced frequency (flash rate) which is less uncomfortable for some users.

In FIG. 4, the frame rate of the video game is still 120 FPS. However, to reduce the flash rate to less than 3 times per second (thus help provide improved comfort to users with sensitivity to flashing lights), the pixels are rendered such that the average pixel brightness changes between a maximum level ("1") and minimum level ("0") less than 3 times per second. In this particular example, the flash rate is changed to 2.5 times per second, meaning the average pixel brightness periodically changes between the maximum and minimum levels every 48 frames (rather than every 12 frames, as before).

This is illustrated in the graph 401, which shows a periodic increase (up to "1") and decrease (down to "0") of the average pixel brightness over a period of 48 frames (so each flash cycle now lasts 48 frames). The difference experienced by the user can be seen by considering again the 12 consecutive frames 300 corresponding to frame numbers 1-12 of the graph 401. Now, rather than the entire flash cycle being implemented over these frames (as in FIG. 3), only a quarter of the flash cycle is implemented. This means the average pixel brightness of the frames starts at 0.5 (at frame 1) and gradually increases over frames 2 to 12 until it reaches its maximum (at frame 13—not shown).

Over a given time period, the user thus experiences the same video game frame rate (meaning the user's enjoyment of the video game is not impaired) but experiences a slower flashing of lighting (thereby improving user comfort).

In an example, in order to determine whether an adjustment to the rate of change of the average pixel brightness is required (e.g. to determine whether it is necessary to change from the 12-frame flash cycle of FIG. 3 to the 48-frame flash cycle of FIG. 4), the magnitude of the increase and/or decrease in average pixel brightness between successive frames in a set of frames as instructed by the video game code may be determined and compared to a threshold. This is implemented by the CPU 20 and/or GPU 30, for example. If the threshold is exceeded, the brightness value of at least a portion of the pixels in at least a portion of the frames in the set is adjusted to bring the change in average pixel brightness between successive frames in the set below the threshold.

In an example, the threshold is set as a change in average pixel brightness between successive frames of 0.042. This corresponds to the average change in average pixel brightness between successive frames in FIG. 4 (corresponding to a flash rate of 2.5 times per second). In this example, it is calculated based on the number of frames between over which the average pixel brightness changes from 0.5 to 1. This occurs over 12 frames and therefore the average change in average pixel brightness between successive frames is (1−0.5)/12=0.042. This will be different depending on the desired flash rate (with the average change in average pixel brightness between successive frames decreasing for a lower desired flash rate and increasing for a higher desired flash rate) and number of frames per second (with the average change in average pixel brightness between successive frames decreasing for a higher FPS and increasing for a lower FPS). In an example, the desired flash rate is less than 16 flashes per second or, more particularly, less than 3 flashes per second to help address discomfort for users. A different threshold could be used, however.

Figure 5:
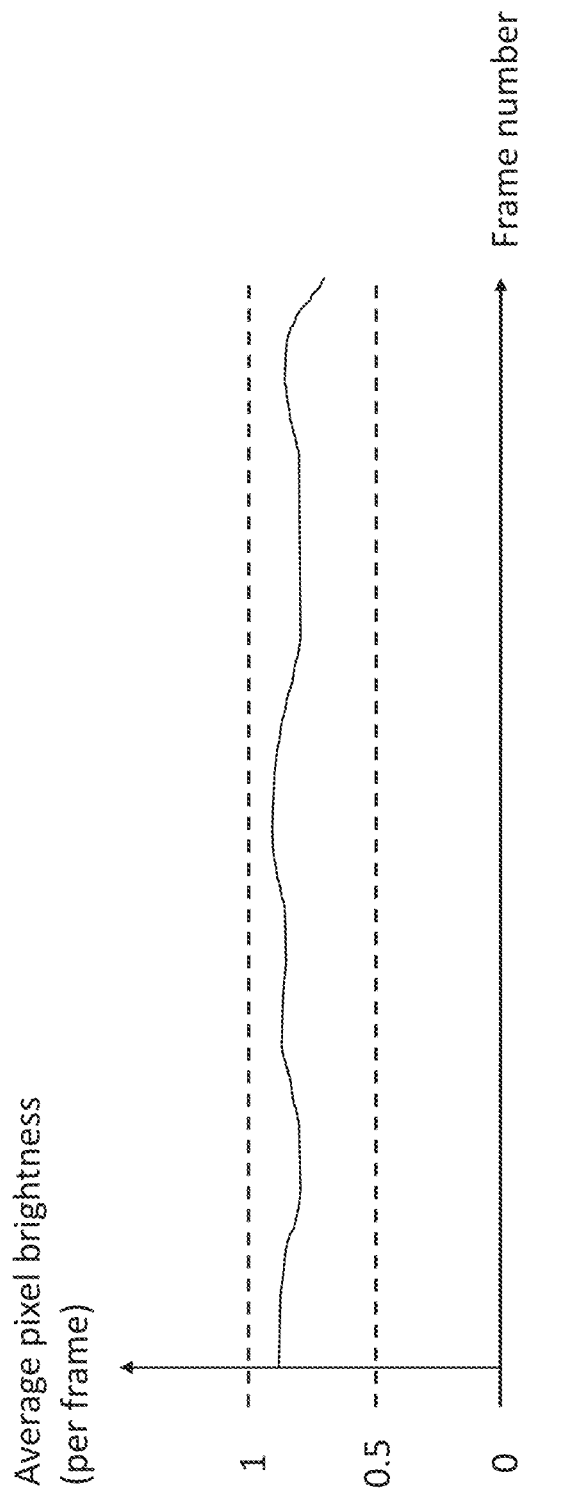
FIG. 5 exemplifies average pixel brightness for an example set of frames in which the magnitude of the change in average pixel brightness between any two successive frames does not exceed a threshold.

FIG. 5 shows the average pixel brightness for an example set of frames in which the magnitude of the change in average pixel brightness between any two successive frames does not exceed the threshold. The set of frames may contain any number of consecutive frames. In an example, the number of frames in a set is the number of frames rendered per second. Thus, for instance, if frames are rendered at 120 FPS, the first 120 rendered frames forms a first set, the next 120 rendered frames forms a second set, the next 120 rendered frames forms a third set, and so on. In this case, because the threshold has not been exceeded, the average pixel brightness is not adjusted and thus the pixels of each frame are rendered in a conventional manner using the pixel shader as instructed by the video game code.

Figure 6:
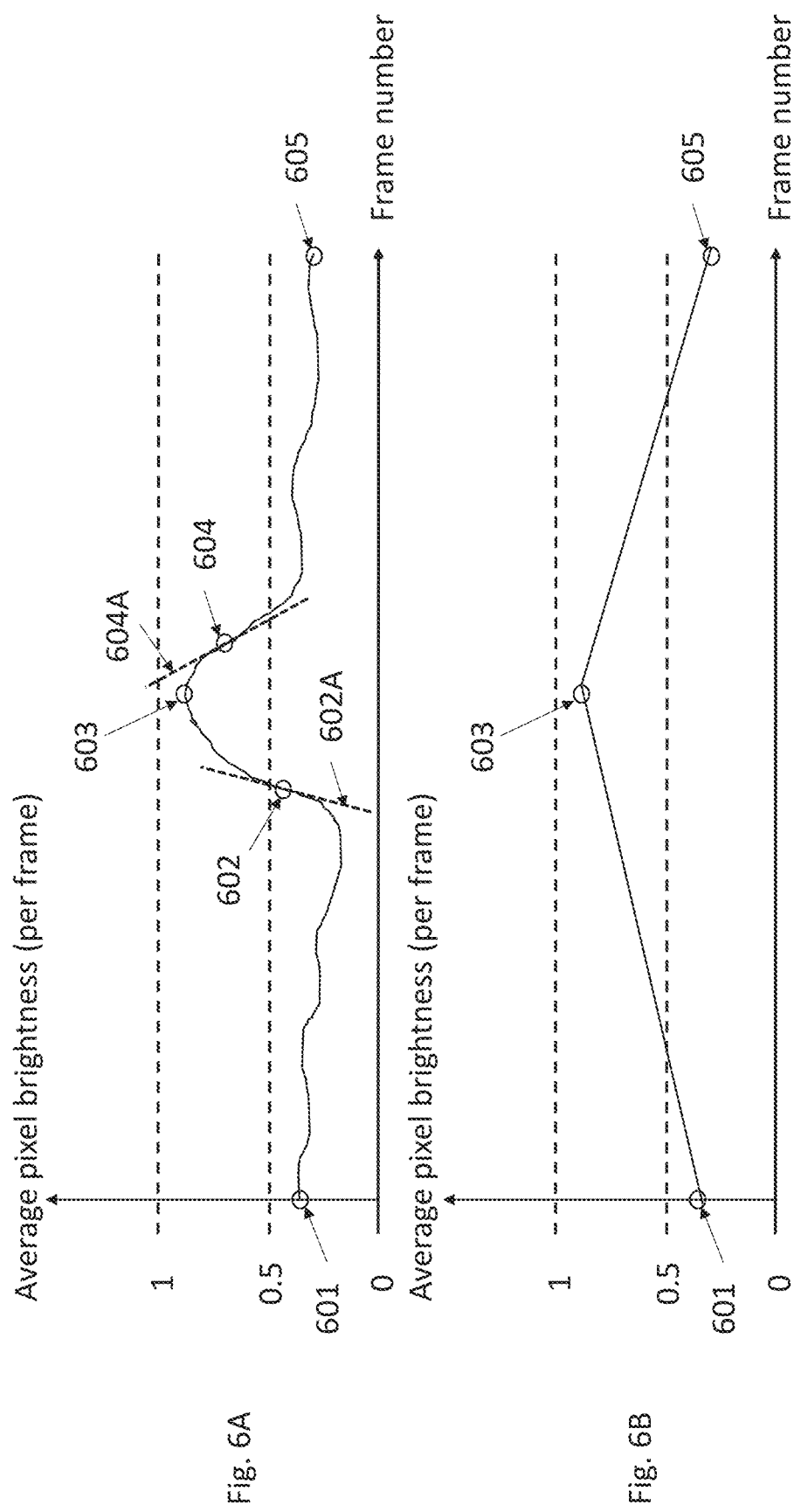
FIG. 6A exemplifies the average pixel brightness for a different example set of frames in which the magnitude of the change in the average pixel brightness between two successive frames does exceed the threshold.
FIG. 6B illustrates an example adjustment to the average pixel brightness of FIG. 6A.

On the other hand, FIG. 6A shows the average pixel brightness for a different example set of frames (e.g. a set of frames occurring before or after set of frames of FIG. 5) in which the magnitude of the change in the average pixel brightness between two successive frames does exceed the threshold. This occurs, in this example, twice, once for the frame located at location 602 and once for the frame located at location 604. The change in average pixel brightness for each of the frames located at locations 602 and 604 is determined with respect to the immediately subsequent or immediately preceding frame of that frame, for example. A gradient line 602A and 604A for each of the locations 602 and 604, respectively, is shown in FIG. 6A. The gradient lines represent the rate of change of the average pixel brightness for the frames at these locations, with a positive gradient (e.g. gradient line 602A) indicating an increase in the average pixel brightness and a negative gradient (e.g. gradient line 604A) indicating a decrease in the average pixel brightness. The steeper the gradient line, the greater the magnitude of the rate of change of the average pixel brightness and therefore the greater the likelihood that the change in average pixel brightness is associated with flashing lighting which may be uncomfortable for some users.

In this example, the magnitude of the change in average pixel brightness between successive frames for the frame at location 602 and for the frame at location 604 is greater than the threshold (e.g. 0.042). The brightness of the pixels of the frames in the set of frames of FIG. 6A is therefore adjusted, as exemplified in FIG. 6B. In an example, the brightness of each pixel of each frame as instructed by the video game code is adjusted (e.g. by the CPU 20 and/or GPU 30) prior to rendering using the pixel shader. For example, for each frame, the difference between the original average pixel luminance of the frame (corresponding to the original average pixel brightness) and the adjusted average pixel luminance of the frame (corresponding to the adjusted average pixel brightness) may be calculated and added to the luminance of each pixel in the frame.

In FIG. 6B, the average pixel brightness of the first frame of the set (at location 601), the last frame of the set (at location 606) and the frame of the set with the brightest average pixel brightness (at location 603) stays the same. However, the brightness of the pixels of each of the other frames in the set is adjusted such that the average pixel brightness changes linearly from frame to frame from the average pixel brightness of the first frame (at location 601) to the average pixel brightness of the brightest frame (at location 603) and then to the average pixel brightness of the last frame (at location 605).

In this example, the first frame of the set (frame number 1 at location 601) has an average pixel brightness of 0.35, the brightest frame of the set (frame number 72 at location 603) has an average pixel brightness of 0.80 and the last frame of the set (from number 120 at location 605) has an average pixel brightness of 0.30. The adjusted average pixel brightness thereby linearly increases from frame number 1 to frame number 72 in steps of ((0.80−0.35)/(72−1))=0.0063 for each successive frame. The adjusted average pixel brightness also linearly decreases from frame number 72 to frame number 210 in steps of ((0.80−0.30)/(120−72))=0.010 for each successive frame. Successive changes of 0.0063 and 0.010 are less in magnitude than the threshold 0.042 and therefore the user's perception of flashing lighting is reduced.

A similar approach as exemplified in FIG. 6B may be used if, for example, the threshold of the magnitude of the change in average pixel brightness between successive frames is exceeded due to a local minimum in the average pixel brightness of the set of frames (rather than a local maximum in the average pixel brightness of the set of frames, as exemplified in FIG. 6A at location 603). In this case, the average pixel brightness of the first frame of the set, the last frame of the set and the frame of the set with the lowest average pixel brightness (defining the local minimum) stays the same. However, the brightness of the pixels of each of the other frames in the set is adjusted such that the average pixel brightness changes linearly from frame to frame from the average pixel brightness of the first frame to the average pixel brightness of the least bright frame and then to the average pixel brightness of the last frame.

In an example, if, after initially adjusting the average pixel brightness as exemplified (that is, keeping the average pixel brightness of the brightest frame or the least bright frame the same), the change in the average pixel brightness between successive frames is still greater in magnitude than the threshold, the average pixel brightness of the brightest frame (or least bright frame) may be reduced (or increased) until the threshold is no longer exceeded. Thus, for example, if frame number 1 of the set has a brightness of 0.50 and frame number 6 of the set has a brightness of 0.75 and is the brightest frame of the set then, even if the average pixel brightness is adjusted (e.g. in a linear fashion), the minimum change in average pixel brightness between successive frames between frame number 1 and frame number 6 is still ((0.75−0.50)/(6−1))=0.050. This is greater than the threshold of 0.042 and thus may still result in the user experiencing an undesirable flashing sensation. This may be addressed by reducing the average pixel brightness of frame number 6 to 0.70. This results in the minimum average change in average pixel brightness between success frames being reduced to ((0.70−0.50)/(6−1))=0.040, which is less than the threshold.

Thus, in general, when the average pixel brightness is to be adjusted for a set of frames, the average pixel brightness of the first frame of the set, the final frame of the set and the brightest or least bright frame of the set are retained. The average pixel brightness of each of the remaining frames is then adjusted to reduce the magnitude of the change in average pixel brightness between any two successive frames to less than the threshold.

In an example, this may be achieved linearly. In this case, the magnitude increase (or decrease) in average pixel brightness (APB) between successive frames from the first frame of the set (frame number 1) to the brightest (or least bright) frame of the set (frame number X) is given by:

Change=|(APB [frame number X]−APB [frame number 1]/(X−1)|

Similarly, the magnitude increase (or decrease) in average pixel brightness between successive frames from the brightest (or least bright) frame of the set (frame number X) to the final frame of the set (frame number N, for a set consisting of N frames) to is given by:

Change=|(APB [frame number N]−APB [frame number X]/(N−X)|

Here, APB [frame number n] refers to the average pixel brightness of the $n^{th}$ frame of the set and a set has N frames labelled, respectively, from frame number 1 to frame number N.

Furthermore, if the calculated change still exceeds the threshold, the average pixel brightness of the brightest (or least bright) frame is adjusted.

In this case, if frame number X is the brightest frame, the average pixel brightness of frame number X may be adjusted to be:

Min {(X−1)*[Threshold]+APB [frame number 1],

{(N−X)*−[Threshold]+APB [frame number X]}

If frame number X is the least bright frame, the average pixel brightness of frame number X may be adjusted to be:

Max 1{(X−1)*−[Threshold]+APB [frame number 1],

{(N−X)*[Threshold]+APB [frame number X]}

Here, [Threshold] is the threshold determined in advance (e.g. 0.042) and, in this example, always takes a positive value when used with the above equations.

This is only an example and other approaches to the exemplified linear approach may be used. For example, the adjusted average pixel brightness (per frame) may have a higher order polynomial relationship (e.g. parabolic relationship) with respect to frame number rather than the linear relationship exemplified in FIG. 6B.

In an example, adjustment to the average pixel brightness of each frame in a set is made (e.g. in the way described above) when the change of average pixel brightness between two successive frames exceeds the threshold at least a predetermined number of times in the set. For example, the predetermined number may be one (so that a single change in average pixel brightness between consecutive frames in the set exceeding the threshold causes the average pixel adjustment processing to be performed on the set) or greater than one (so that a plurality of changes in average pixel brightness between different respective pairs of successive frames in the set must exceed the threshold to cause the average pixel adjustment processing to be performed on the set). The predetermined number may be determined depending on the number of frames in a set and the number of frames displayed per second in order to alleviate the appearance of flashing lighting at frequencies which may be uncomfortable to a user. For example, if flashing lighting which flashes with a frequency greater than or equal to F is known to cause discomfort to a user (e.g. where F is between 3 and 60 or between 16 and 25 flashes per second), the predetermined number in each set of frames may be:

Predetermined number=F*([number of frames in set]/[number of frames displayed per second]

The nature of the change in average pixel brightness (e.g. whether it is an increase or decrease) may also be considered. In an example, a user may only be caused discomfort if there is a rapid increase followed by a rapid decrease in average pixel brightness (or vice versa) but not when there is only a rapid increase (without a subsequent rapid decrease) or rapid decrease (without a subsequent rapid increase). In this case, it is determined whether the number of increases in average pixel brightness between consecutive frames in the set of frames exceeding the threshold (as exemplified by location 602 in FIG. 6A) is greater than or equal to the predetermined number and whether the number of decreases in average pixel brightness between consecutive frames in the set of frames exceeding the threshold (as exemplified by location 605 in FIG. 6A) is greater than or equal to the predetermined number. Only if both conditions are fulfilled is the average pixel brightness of the frames of the set adjusted. Thus, for example, if the predetermined number is 3, then, in a set of frames, there would need to be 3 frame-to-frame increases in average pixel brightness with a magnitude exceeding the threshold and 3 frame-to-frame decreases in average pixel brightness with a magnitude exceeding the threshold in order for the average pixel brightness of the frames in the set to be adjusted. This helps alleviate unnecessary adjustment of the appearance of the content.

With the present technique, by considering and adjusting (if necessary) consecutive sets of frames in the way described, only the frames which may cause discomfort to the user due to the presence of flashing lighting (that is, those in the sets which are adjusted) are subject to the average pixel brightness adjustment. The other frames (that is, those in the sets which are not adjusted) are not subject to the average pixel brightness adjustment. This achieves an improved balance between allowing the user to view the content as the creator intended whilst alleviating discomfort caused by flashing lighting. Furthermore, since the average pixel brightness of the first and last frames in each set of frames remains the same, a smooth transition between consecutive sets of frames is maintained. Also, since the average pixel brightness adjustment processing is only performed on the frames for which it is required, an increase in the processing burden is suppressed.

In an example, the user may configure the games console 110 to perform or not perform the adjustment of average pixel brightness (as exemplified above). This provides improved user flexibility and convenience, since it enables users who may experience discomfort with flashing lighting to enable the adjustment of average pixel brightness to alleviate this but allows users who do not experience such discomfort to view or interact with visual content (such as a video game) in its original (non-adjusted form).

It is known for some devices such as games consoles to provide a warning screen when the device is turned on to warn about health hazards associated with using the device. To improve user convenience, the console may allow the adjustment of average pixel brightness to reduce flashing lighting via interaction with this warning screen.

Figure 7:
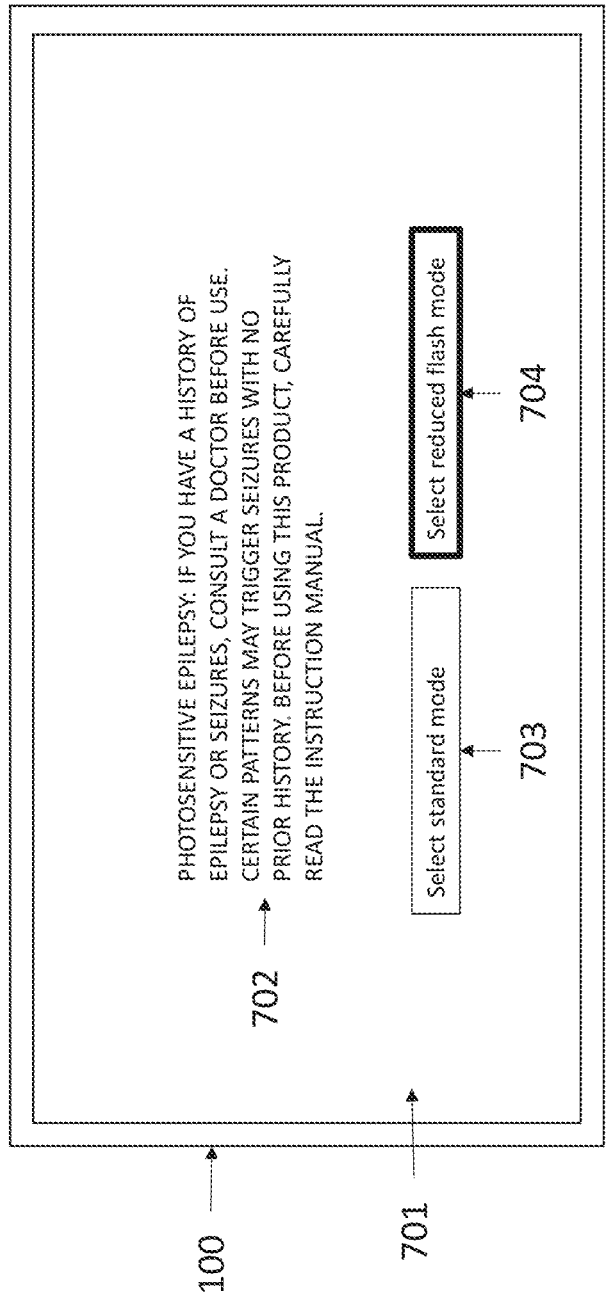
FIG. 7 schematically illustrates a screen for selection of a reduced flash mode.

An example of this is shown in FIG. 7, which shows a warning screen 701 output by the games console 110 to the display device 100 when the games console is first turned on. The warning screen 701 comprises a textual warning 702 but also includes virtual selectable buttons 703 and 704 (which the user may select using controller 140, for example). Selection of the first virtual button 703 causes the games console 110 to launch in a standard mode. In this case, all pixels in subsequently displayed content are rendered in their original form. On the other hand, selection of the second virtual button 704 causes the games console 110 to launch in a reduced flash mode. In this case, adjustment of the average pixel brightness is performed, for example, as described above. Selection of the reduced flash mode in this way allows the user to easily instruct adjustment of the average pixel brightness to be applied to any content which is then output for display by the games console 110. The games console 110 may also be switched between the standard mode and reduced flash mode manually using a menu system (not shown). In an example, the menu system may be comprised within a parental controls menu system (which is only accessible via a passcode or the like) in order to allow a parent to enable the reduced flash mode for a child user. This allows potential discomfort or sickness in the child caused by flashing lights to be addressed and helps gives the parent piece of mind that the reduced flash mode cannot be disabled by the child.

Although, in the above examples, the pixel brightness adjustment is implemented based on the average pixel brightness (e.g. average pixel luminance or intensity) of each frame, the pixel brightness adjustment may instead be implemented based on individual pixels from frame-to-frame (e.g. based on how the luminance or intensity of each pixel changes from frame-to-frame) or groups of pixels from frame-to-frame (e.g. based on the average pixel luminance or intensity of those groups). The luminance or intensity of a pixel (which is indicative of the brightness of that pixel) is defined by its pixel value (e.g. a greyscale pixel value or a colour pixel value in an appropriate colour space such as RGB or YCbCr).

In the case of an individual pixel, for example, the average pixel brightness and adjusted average pixel brightness shown in FIGS. 6A and 6B would instead be the brightness and adjusted brightness of an individual pixel, and this would be performed for every pixel.

In the case of a group of pixels (which represent a portion of the pixels in each frame), for example, the average pixel brightness and adjusted average pixel brightness shown in FIGS. 6A and 6B would instead be the average pixel brightness and adjusted average pixel brightness of the pixels in the group. The pixels in a group may be determined based on one or more criteria. For example, a group may contain pixels with a colour within a predetermined subspace of a defined colour space. This allows the flashing lighting reduction to be focussed on colours users are most sensitive to, for example.

This allows the flashing lighting reduction to be performed only on certain pixels in each frame (e.g. those which exhibit a change in brightness between consecutive frames which exceeds the threshold) rather than on the entire frame. This may help retain the original appearance of the image as far as possible whilst also alleviating user discomfort.

Performing adjustment of the average pixel brightness or the brightness of individual pixels or groups of pixels may be selected based on a desired balance between processing burden and the extent to which the original appearance of each frame is to be retained.

For example, by performing adjustment on the average pixel brightness of each frame, the processing associated with determining whether a change in brightness between consecutive frames exceeds the threshold needs to only be carried out once per frame (based on the average pixel luminance or intensity, for example), thereby reducing the processing burden but causing adjustment of the brightness each frame in its entirety.

On the other hand, by performing adjustment on the pixel brightness of each individual pixel of each frame, the processing associated with determining whether a change in brightness between consecutive frames exceeds the threshold must be carried out many times per frame (depending on the number of pixels in each frame), thereby increasing the processing burden but causing adjustment only to the portion(s) of each frame which are likely to cause user discomfort.

A content developer may determine whether adjustment of the average pixel brightness or the brightness of individual pixels or groups of pixels is to be performed and indicate this in code associated with the content (e.g. the video game code), for example. Selection of a reduced flash mode (e.g. as exemplified in FIG. 7) then causes the brightness adjustment to be performed according to this indication.

Figure 8:
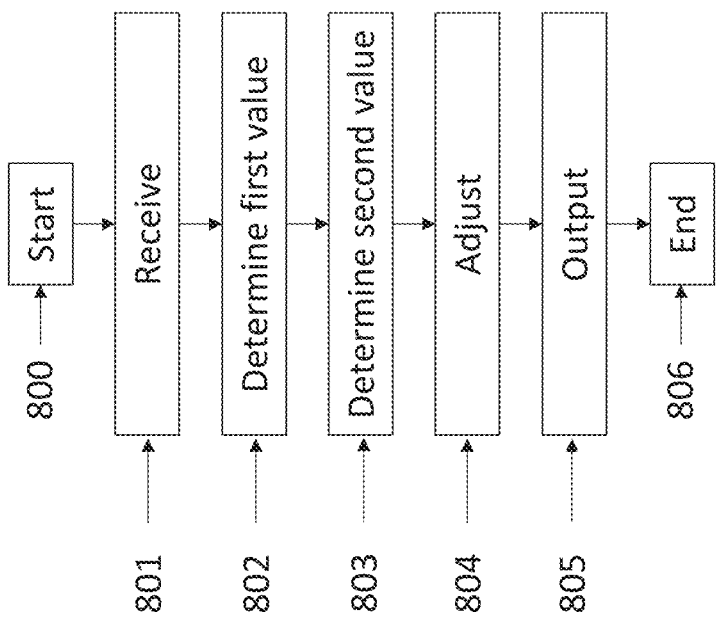
FIG. 8 illustrates an example method.

A method according to the present technique is shown in FIG. 8. The method is carried out by circuitry of a data processing apparatus (e.g. the CPU 20 and/or GPU 30 of the games console 110). The method starts at step 800. At step 801, one or more pairs of first and second frames of a video image to be output for display are received. For example, the frame at location 602 in FIG. 6A and its immediately preceding frame form one pair of frames and the frame at location 604 in FIG. 6A and its immediately preceding frame form another pair of frames. The video image may be that of a video game and may be generated by the CPU 20 and/or GPU 30, for example.

At step 802, a first value (e.g. luminance or average luminance) indicative of a brightness of one or more pixels of the first frame in each pair is determined. At step 803, a second value (e.g. luminance or average luminance) indicative of a brightness of a corresponding one or more pixels of the second frame in each pair (that is, pixels at the same position(s) as the one or more pixels of the first frame, for example) is determined. At step 804, based on a difference between the first and second values of each pair (for example, whether the magnitude of the difference for a predetermined number of pairs exceeds a threshold), a pixel value of the one or more pixels of the first frame in each pair and/or a pixel value of the corresponding one or more pixels of the second frame in each pair is adjusted to reduce the magnitude of the difference between the first and second values of each pair. This is exemplified in FIGS. 6A and 6B and involves, for example, adjusting the pixel value of each of the one or more pixels to reduce or increase the luminance of that pixel, for example. At step 805, the first and second frames of each pair with the adjusted pixel value of the one or more pixels of the first frame and/or with the adjusted pixel value of the corresponding one or more pixels of the second frame are output for display (e.g. to display device 100 via A/V port 90). The method ends at step 806.

Embodiment(s) of the present disclosure are defined by the following numbered clauses:

1. A data processing apparatus comprising circuitry configured to: receive one or more pairs of first and second frames of a video image to be output for display; determine a first value indicative of a brightness of one or more pixels of the first frame in each pair; determine a second value indicative of a brightness of a corresponding one or more pixels of the second frame in each pair; based on a difference between the first and second values of each pair, adjust a pixel value of the one or more pixels of the first frame in each pair or adjust a pixel value of the corresponding one or more pixels of the second frame in each pair to reduce the magnitude of the difference between the first and second values of each pair; and output the first and second frames of each pair with the adjusted pixel value of the one or more pixels of the first frame or with the adjusted pixel value of the corresponding one or more pixels of the second frame for display.

2. A data processing apparatus according to clause 1, wherein the circuitry is configured to: determine if a magnitude of a difference between the first and second values of each pair exceeds a threshold; and adjust a pixel value of the one or more pixels of the first frame in each pair or adjust a pixel value of the corresponding one or more pixels of the second frame in each pair to reduce the magnitude of the difference between the first and second values of each pair if the threshold is exceeded for a predetermined number of pairs.

3. A data processing apparatus according to clause 2, wherein the threshold is determined based on a desired flash rate of flashing lighting in the video image and a number of frames per second of the video image.

4. A data processing apparatus according to clause 3, wherein the desired flash rate is less than 16 flashes per second or, more particularly, less than 3 flashes per second.

5. A data processing apparatus according to any one of clauses 2 to 4, wherein the circuitry is configured to: adjust a pixel value of the one or more pixels of the first frame in each pair or adjust a pixel value of the corresponding one or more pixels of the second frame in each pair to reduce the magnitude of the difference between the first and second values of each pair if the threshold is exceeded for a predetermined number of pairs for which the difference between the first and second values is positive and for which the difference between the first and second values is negative.

6. A data processing apparatus according to any preceding clause, wherein the first value is indicative of an average brightness of the pixels of the first frame and the second value is indicative of an average brightness of the pixels of the second frame.

7. A data processing apparatus according to any preceding clause, wherein: the first and second frames in each pair are consecutive frames of a set of consecutive frames of the video image; and the circuitry is configured to: if possible, adjust a pixel value of a corresponding one or more pixels of each frame in the set to reduce the magnitude of the difference between the first and second values of each pair to less than or equal to the threshold while retaining a brightness of the corresponding one or more pixels of a frame of the set having the brightest or least bright corresponding one or more pixels; else adjust a pixel value of the corresponding one or more pixels of each frame in the set to reduce the magnitude of the difference between the first and second values of each pair to less than or equal to the threshold while reducing the brightness of the corresponding one or more pixels of the frame of the set having the brightest corresponding one or more pixels or increasing the brightness of the corresponding one or more pixels of the frame of the set having the least bright corresponding one or more pixels.

8. A data processing apparatus according to any preceding clause, wherein the video image is video game.

9. A data processing method comprising: receiving one or more pairs of first and second frames of a video image to be output for display; determining a first value indicative of a brightness of one or more pixels of the first frame in each pair; determining a second value indicative of a brightness of a corresponding one or more pixels of the second frame in each pair; based on a difference between the first and second values of each pair, adjusting a pixel value of the one or more pixels of the first frame in each pair or adjusting a pixel value of the corresponding one or more pixels of the second frame in each pair to reduce the magnitude of the difference between the first and second values of each pair; and outputting the first and second frames of each pair with the adjusted pixel value of the one or more pixels of the first frame or with the adjusted pixel value of the corresponding one or more pixels of the second frame for display.

10. A program for controlling a computer to perform a method according to clause 9.

11. A storage medium storing a program according to clause 10.

Numerous modifications and variations of the present disclosure are possible in light of the above teachings. It is therefore to be understood that, within the scope of the claims, the disclosure may be practiced otherwise than as specifically described herein.

In so far as embodiments of the disclosure have been described as being implemented, at least in part, by one or more software-controlled information processing apparatuses, it will be appreciated that a machine-readable medium (in particular, a non-transitory machine-readable medium) carrying such software, such as an optical disk, a magnetic disk, semiconductor memory or the like, is also considered to represent an embodiment of the present disclosure. In particular, the present disclosure should be understood to include a non-transitory storage medium comprising code components which cause a computer to perform any of the disclosed method(s).

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more computer processors (e.g. data processors and/or digital signal processors). The elements and components of any embodiment may be physically, functionally and logically implemented in any suitable way. Indeed, the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to these embodiments. Additionally, although a feature may appear to be described in connection with particular embodiments, one skilled in the art would recognize that various features of the described embodiments may be combined in any manner suitable to implement the present disclosure.

The invention claimed is:

1. A data processing apparatus comprising circuitry configured to:
   receive one or more pairs of first and second frames of a video image to be output for display;
   determine a first value indicative of a brightness of one or more pixels of the first frame in each pair;
   determine a second value indicative of a brightness of a corresponding one or more pixels of the second frame in each pair;
   based on a difference between the first and second values of each pair, adjust a pixel value of the one or more pixels of the first frame in each pair or adjust a pixel value of the corresponding one or more pixels of the second frame in each pair to reduce the magnitude of the difference between the first and second values of each pair; and output the first and second frames of each pair with the adjusted pixel value of the one or more pixels of the first frame or with the adjusted pixel value of the corresponding one or more pixels of the second frame for display.

2. A data processing apparatus according to claim 1, wherein the circuitry is configured to:
determine if a magnitude of a difference between the first and second values of each pair exceeds a threshold; and
adjust a pixel value of the one or more pixels of the first frame in each pair or adjust a pixel value of the corresponding one or more pixels of the second frame in each pair to reduce the magnitude of the difference between the first and second values of each pair if the threshold is exceeded for a predetermined number of pairs.

3. A data processing apparatus according to claim 2, wherein the threshold is determined based on a desired flash rate of flashing lighting in the video image and a number of frames per second of the video image.

4. A data processing apparatus according to claim 3, wherein the desired flash rate is at least one of: less than sixteen flashes per second, and less than three flashes per second.

5. A data processing apparatus according to claim 2, wherein the circuitry is configured to: adjust a pixel value of the one or more pixels of the first frame in each pair or adjust a pixel value of the corresponding one or more pixels of the second frame in each pair to reduce the magnitude of the difference between the first and second values of each pair if the threshold is exceeded for a predetermined number of pairs for which the difference between the first and second values is positive and for which the difference between the first and second values is negative.

6. A data processing apparatus according to claim 1, wherein the first value is indicative of an average brightness of the pixels of the first frame and the second value is indicative of an average brightness of the pixels of the second frame.

7. A data processing apparatus according to claim 1, wherein:
the first and second frames in each pair are consecutive frames of a set of consecutive frames of the video image; and
the circuitry is configured to:
if possible, adjust a pixel value of a corresponding one or more pixels of each frame in the set to reduce the magnitude of the difference between the first and second values of each pair to less than or equal to the threshold while retaining a brightness of the corresponding one or more pixels of a frame of the set having the brightest or least bright corresponding one or more pixels;
else adjust a pixel value of the corresponding one or more pixels of each frame in the set to reduce the magnitude of the difference between the first and second values of each pair to less than or equal to the threshold while reducing the brightness of the corresponding one or more pixels of the frame of the set having the brightest corresponding one or more pixels or increasing the brightness of the corresponding one or more pixels of the frame of the set having the least bright corresponding one or more pixels.

8. A data processing apparatus according to claim 1, wherein the video image is video game.

9. A data processing method comprising:
receiving one or more pairs of first and second frames of a video image to be output for display;
determining a first value indicative of a brightness of one or more pixels of the first frame in each pair;
determining a second value indicative of a brightness of a corresponding one or more pixels of the second frame in each pair;
based on a difference between the first and second values of each pair, adjusting a pixel value of the one or more pixels of the first frame in each pair or adjusting a pixel value of the corresponding one or more pixels of the second frame in each pair to reduce the magnitude of the difference between the first and second values of each pair; and
outputting the first and second frames of each pair with the adjusted pixel value of the one or more pixels of the first frame or with the adjusted pixel value of the corresponding one or more pixels of the second frame for display.

10. A non-transitory computer readable storage medium storing a computer program for controlling a computer to perform a data processing method comprising:
receiving one or more pairs of first and second frames of a video image to be output for display;
determining a first value indicative of a brightness of one or more pixels of the first frame in each pair;
determining a second value indicative of a brightness of a corresponding one or more pixels of the second frame in each pair;
based on a difference between the first and second values of each pair, adjusting a pixel value of the one or more pixels of the first frame in each pair or adjusting a pixel value of the corresponding one or more pixels of the second frame in each pair to reduce the magnitude of the difference between the first and second values of each pair; and
outputting the first and second frames of each pair with the adjusted pixel value of the one or more pixels of the first frame or with the adjusted pixel value of the corresponding one or more pixels of the second frame for display.

* * * * *